(12) United States Patent
Roy

(10) Patent No.: US 8,880,618 B2
(45) Date of Patent: Nov. 4, 2014

(54) EMAIL COMMUNICATIONS SYSTEM WITH WIRELESS DEVICE MOVE RECONCILIATION FEATURES AND RELATED METHODS

(75) Inventor: Shaibal Roy, Kolkata (IN)

(73) Assignee: BlackBerry Limited, Waterloo, Ontario (CA)

( * ) Notice: Subject to any disclaimer, the term of this patent is extended or adjusted under 35 U.S.C. 154(b) by 1795 days.

(21) Appl. No.: 12/030,994

(22) Filed: Feb. 14, 2008

(65) Prior Publication Data

US 2008/0201439 A1 Aug. 21, 2008

Related U.S. Application Data

(60) Provisional application No. 60/889,967, filed on Feb. 15, 2007.

(51) Int. Cl.
*G06F 15/16* (2006.01)
*H04L 12/58* (2006.01)
*G06Q 10/10* (2012.01)

(52) U.S. Cl.
CPC .............. *G06Q 10/107* (2013.01); *H04L 51/38* (2013.01); *H04L 51/22* (2013.01)
USPC ........................................................ 709/206

(58) Field of Classification Search
USPC ......................................... 709/206; 707/102
See application file for complete search history.

(56) References Cited

U.S. PATENT DOCUMENTS

| | | | | |
|---|---|---|---|---|
| 5,961,590 A | * | 10/1999 | Mendez et al. | 709/206 |
| 6,983,308 B1 | * | 1/2006 | Oberhaus et al. | 709/206 |
| 2004/0059791 A1 | | 3/2004 | Sherman et al. | 709/207 |
| 2006/0041603 A1 | | 2/2006 | Paterson et al. | 707/204 |
| 2006/0101064 A1 | * | 5/2006 | Strong et al. | 707/102 |
| 2006/0155810 A1 | * | 7/2006 | Butcher | 709/206 |

FOREIGN PATENT DOCUMENTS

WO WO2004045171 5/2004 ............. H04L 12/58

* cited by examiner

*Primary Examiner* — Brian P Whipple
(74) *Attorney, Agent, or Firm* — Allen, Dyer, Doppelt, Milbrath & Gilchrist, P.A.

(57) ABSTRACT

An email communications system for operating over a communications network may include an email server having a server inbox for receiving and storing email via the communications network and having a server email storage folder. The system may further include at least one wireless email communications device having a device inbox, and an email proxy server for communicating with the email server and the at least one wireless email communications device via the communications network. The email proxy server may be for forwarding email from the server inbox to the device inbox, detecting a deletion of a given email from the server inbox, and if the deletion of the given email from the server inbox is not preceded by copying of the given email to the server email storage folder, then causing the wireless email communications device to also delete the given email from the device inbox based thereon.

20 Claims, 4 Drawing Sheets

EMAIL COMMUNICATIONS SYSTEM WITH WIRELESS DEVICE MOVE RECONCILIATION FEATURES AND RELATED METHODS

RELATED APPLICATION

This application is based upon prior filed provisional application Ser. No. 60/889,967 filed Feb. 15, 2007, the entire subject matter of which is incorporated herein by reference in its entirety.

FIELD OF THE INVENTION

The present invention relates to the field of communications systems, and, more particularly, to wireless electronic mail (email) communications systems and related methods.

BACKGROUND

Electronic mailboxes are used to store electronic mail (email) messages. Electronic mailboxes are connected to the Internet to enable users to send and receive incoming and outgoing email messages. These mailboxes may also be extended to deliver email to mobile wireless communication devices via wireless networks. In the case of a corporation, electronic mailboxes are typically located on email servers at the corporation. On the other hand, mailboxes for small businesses or individuals are typically located on Internet service provider (ISP) email servers.

Mail user agents (MUAs) are applications which use a technique called polling to relay messages from the mail server to the mail program at a user's computer or mobile wireless communications device. A MUA is a program running either on a user's personal computing device (mobile or stationary), or on a shared email relay server that checks for new mail on behalf of a multitude of such users. More particularly, polling is the retrieval of incoming messages from other users at the mail server and delivery of these messages to the user's mailbox.

One problem that can arise with creating multiple copies of an email that a user can view either on a wireless email communications device as well as from other locations (e.g., from a desktop computer connected to the Internet) is that operations performed at one location may not necessarily translate to the other device. That is, it is sometimes difficult to reconcile operations by users performed on emails stored on an email server (e.g., corporate or ISP server) with the emails previously forwarded to the user's wireless email communications device, and vice-versa.

U.S. patent application publication no. 2006/0155310 is directed to a method for managing emails in a mobile terminal of a mobile email system. The mobile email system includes an email system and an email server coupled to a static terminal and in wireless communication with the mobile terminal. The static terminal has a folder-based data storage structure for storing emails received by a user of the static terminal. The email server is also configured to provide the received emails to the mobile terminal. The mobile terminal locally duplicates at least a portion of the state terminal folder-based data storage structure. The user is able to manage emails sent to a single address using the static and the mobile terminal. At the mobile terminal, a command is input from the user to move an email from a first of the local storage folder structure to a second folder of the local storage structure. The method further includes deleting the email from the local storage of the mobile terminal responsive to the user move command. The method further includes sending the move command from the mobile terminal to the email server.

While such systems may provide certain reconciliation advantages, further features may be desirable in some applications. This may be particularly so where it is desired to reconcile operations performed on emails at the email server with emails previously forwarded to a wireless email communications device.

DETAILED DESCRIPTION

Figure 1:
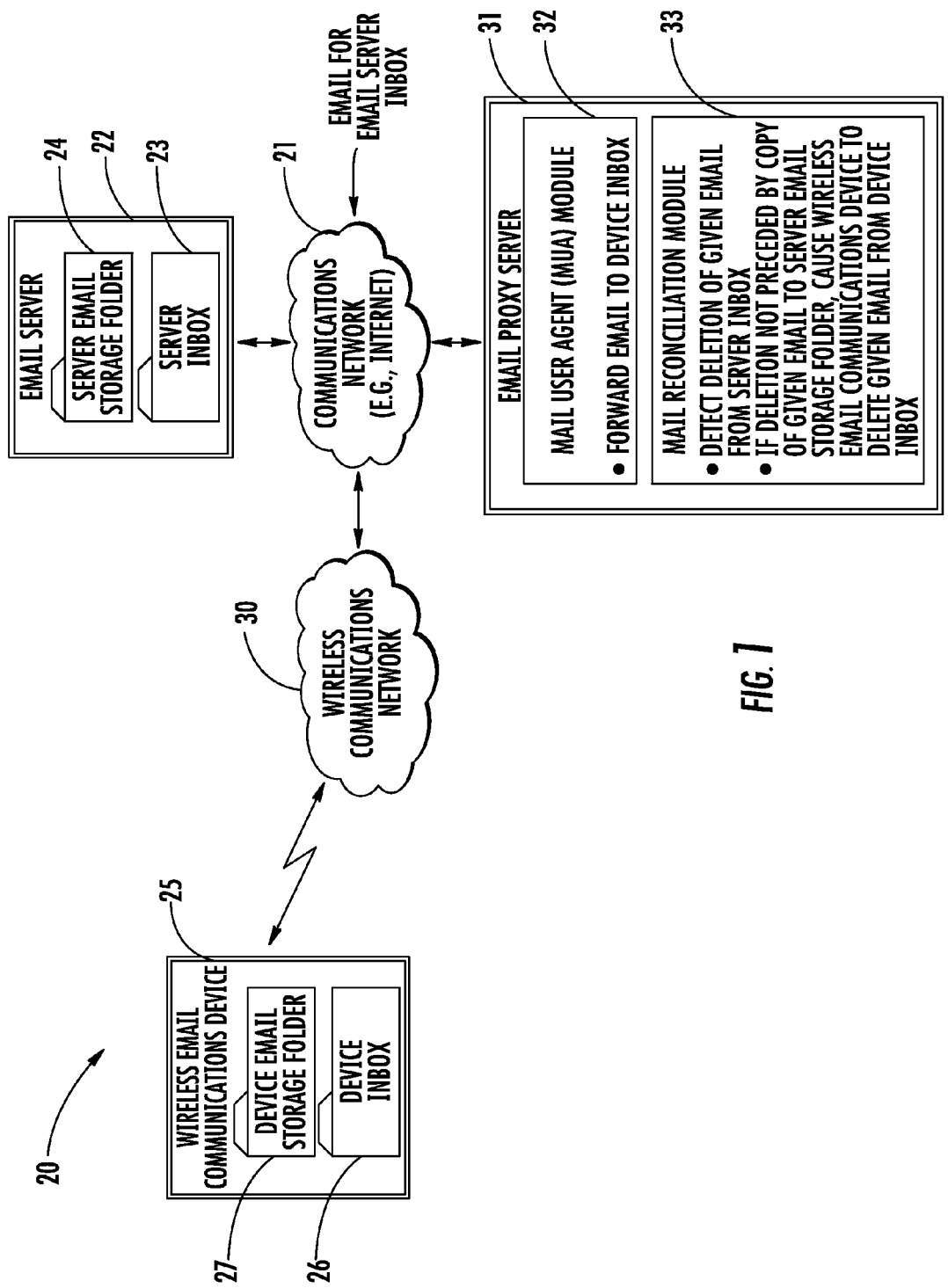
FIG. 1 is a schematic block diagram of an exemplary email communications system embodiment.

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in different embodiments.

Generally speaking, an electronic mail (email) communications system for operating over a communications network is disclosed herein which may include an email server having a server inbox for receiving and storing email via the communications network and having a server email storage folder. The system may further include at least one wireless email communications device having a device inbox, and an email proxy server for communicating with the email server and the at least one wireless email communications device via the communications network. The email proxy server may be for forwarding email from the server inbox to the device inbox, detecting a deletion of a given email from the server inbox, and if the deletion of the given email from the server inbox is not preceded by copying of the given email to the server email storage folder, then causing the wireless email communications device to also delete the given email from the device inbox based thereon.

More particularly, the at least one wireless email communications device may also have a device email storage folder. As such, if the deletion of the given email from the sever inbox is preceded by copying of the given email to the server email storage folder, then the email proxy server may also cause the wireless email communications device to copy the given email from the device inbox to the device email storage folder and delete the given email from the device inbox.

Moreover, the given email may have at least one email processing attribute associated therewith at the email server. Thus, the email proxy server may cooperate with the at least one wireless email communications device to associate the at least one email processing attribute with the given email when copied to the device email storage folder. By way of example, the at least one email processing attribute may be a user read attribute, a user association attribute, etc.

The email communications system may further include a wireless communications network over which the email proxy server and the wireless email communications device communicate. In addition, the email proxy sever may also cause the email server to delete email deleted from the wireless email communications device.

An email proxy server may be for communicating with an email server and at least one wireless email communications device via a communications network, where the email server has a server inbox for receiving and storing email via the communications network and having a server email storage folder, and the at least one wireless email communications device has a device inbox. The email proxy server may include a mail user agent (MUA) module for forwarding email from the server inbox to the device inbox. The email proxy server may further include a mail reconciliation module for detecting a deletion of a given email from the server inbox, and if the deletion of the given email from the server inbox is not preceded by copying of the given email to the server email storage folder, then causing the wireless email communications device to also delete the given email from the device inbox based thereon.

An email communications method may include receiving and storing email in a server inbox of an email server via a communications network, where the email server also has a server email storage folder. The method may further include forwarding email from the server inbox to a device inbox on at least one wireless email communications device, and detecting a deletion of a given email from the server inbox. Moreover, if the deletion of the given email from the server inbox is not preceded by copying of the given email to the server email storage folder, then the method may further include causing the wireless email communications device to also delete the given email from the device inbox based thereon.

Referring initially to FIG. 1, an email communications system 20 is for operating over a communications network 21, such as the Internet in the illustrated example. However, other communications networks may also be used, such as a local area network (LAN), for example. The system 20 illustratively includes an email server 22 having a server inbox 23 for receiving and storing email via the communications network 21, and a server email storage folder 24. More particularly, the email server 22 may be a corporate email server or an ISP email server, for example. As will be appreciated by those skilled in the art, emails may be stored on the email server 22 in accordance with an email folder hierarchy which includes the server inbox 23 as a primary email folder (i.e., the folder in which new emails are initially stored), and then one or more other email storage folders 24. For example, the email storage folder 24 may be a "saved messages" folder or other folder designated by the user. The email server 22 may include a processor and memory (not shown) and operate based upon various email server platforms (e.g., IMAP, Exchange, Notes, etc.)

The system 20 also illustratively includes one or more wireless email communications devices 25. By way of example, the wireless email communications device 25 may be a cellular and/or wireless LAN device which runs an email client application and stores emails also in accordance with an email folder hierarchy. For example, the wireless email communications device 25 may have a device inbox 26 and a device email storage folder 27 that correspond to the server inbox 23 and server email storage folder 24 of the email server 22. The wireless email communications device 25 may communicate via a wireless communications network 30 (e.g., cellular, wireless LAN, etc.) that is illustratively coupled to the communications network 21.

More particularly, the system 20 also illustratively includes an email proxy server 31 for communicating with the email server 22 and the wireless email communications device 25 via the communications network 21 (and wireless communications network 30 in the case of the wireless email communications device). More particularly, the email proxy server 31 illustratively includes a mail user agent (MUA) module 32 for forwarding emails (or portions thereof) from the server inbox 23 to the device inbox 26. For example, if a user has an ISP email account (e.g., Yahoo, GMail, Hotmail, etc.), when email is sent to that user's account it is received and stored in the user's designated server inbox 23 at the email server 22, as will be appreciated by those skilled in the art.

The MUA 32 may periodically poll the email server 23 to determine when new emails are available, and when they are it then forwards a copy of the emails (or portions thereof) to the wireless email communications device 25. It should be noted that in some embodiments the MUA module 32 may simply send a notification (e.g., a Short Message Service (SMS) notification) of new email(s) to the wireless email communications device 25, and the device in turn will request that the emails be downloaded to the device by the MUA module, as will also be appreciated by those skilled in the art.

The email proxy server 31 also illustratively includes a mail reconciliation module 33 which may advantageously be used to reconcile the emails stored on the email server 22 with emails forwarded to the wireless communications device 25. More particularly, using the above-noted example where the email server 22 is an ISP server, if a user has a Webmail interface that allows the user to directly access his account and email folder hierarchy on the email server via a computer terminal over the Internet, the user can perform various operations on a given email stored in the sever inbox 23. By way of example, these operations may include reading, deleting, and/or copying/moving the email to another folder, such as the server email storage folder 24, with or without first reading the email. The mail reconciliation module 33 may therefore advantageously make changes in the device inbox 26 corresponding to the changes made in the server inbox 23, such as deleting emails from the device inbox which have been deleted from the server inbox (and vise-versa).

Yet, a move operation performed by the user at the email server 22 through a Webmail interface may ordinarily be problematic for the mail reconciliation module 33 to properly identify and reconcile with the device inbox 26, for example. This is because the email server 22 performs the requested move operation by copying the given message to the server email storage folder 24, and then deleting the given message from the sever inbox 23. Accordingly, if the email proxy server 31 is configured to only check the server inbox 23, at a first polling the given message will be present in the server inbox, but at the next polling the message will no longer be present in the server inbox (even though it was copied to the server email storage folder 24). Thus, it will appear to the email proxy server 31 as if the given email was simply deleted from the server inbox 23, and the mail reconciliation module 33 may also delete the email from the device inbox 26, which the user may not have intended to occur.

Accordingly, the mail reconciliation module 33 may detect a deletion of the given email from the server inbox 23, and if the deletion of the given email from the server inbox is not preceded by copying of the given email to the server email storage folder 24, then cause the wireless email communications device 25 to also delete the given email from the device inbox 27 based thereon. That is, if the mail reconciliation module 33 finds that subsequent copy and delete operations for a given email are performed within a relatively short period of time by the email server 22, then it can be assumed that the given email was moved to another folder (the server email storage folder 24 in the present example). When this does not happen (i.e., the given email is simply deleted from the server inbox 23), then the email proxy server 31 may assume that the user in fact wants the email deleted permanently and proceed to delete the given email from the device inbox 26 as well.

If the deletion of the given email from the sever inbox 23 is preceded by copying of the given email to the server email storage folder 24, then the email proxy server may advantageously cause the wireless email communications device 25 to similarly copy the given email from the device inbox 26 to the device email storage folder 27 and delete the given email from the device inbox. That is to say, the mail reconciliation module 23 may cause the wireless communications device to perform "mirror image" operations corresponding to the move performed by the email server 22, as will be appreciated by those skilled in the art. Of course, the email proxy server 31 could simply leave the given email in the device inbox 26 in some embodiments.

It should be noted that in some embodiments a delete command at the email server 22 may result in copying of the given email to a "trash" folder, in which case the email server 31 may distinguish that the desired user operation was indeed to delete the message. In such case, the email proxy server 31 could similarly cause the wireless email communications device to copy the given email to a device trash folder, or simply delete the email from the device inbox 26 if no device trash folder is present in the particular device configurations, for example.

In addition, the given email may have at least one email processing attribute or information tag associated therewith at the email server 22. For example, these attributes may include whether the email has been read by the user (i.e., if it is new or not), other users associated with the email, other users who may have read the email, etc. Yet, in some applications, such attributes may be lost to the wireless communications device 25 when an email is moved from the server inbox 23 to the server email storage folder 24, for example. This is because if a user reads the given email in the server inbox 23 and moves it to the server email storage folder 24, if the email proxy server were merely to recognize the subsequent copy and move operations and then perform these same operations at the wireless communications device 25, the given email would appear as an unread message in the device email storage folder 27 (because it was previously an unread email in the device inbox 26), but will appear as a read email in the server email storage folder (because the user read it in the server inbox before moving it).

Thus, the email proxy server 31 may also advantageously cooperate with the wireless email communications device 25 to associate the email processing attributers) with the given email when copied to the device email storage folder 27. Thus, in the above-noted example, when the given email is copied to the device email storage folder 27, it will also be designated as having been read, just as with the given email in the server email storage folder 24. It should also be noted that the above-described operations may also be performed in reverse by the email proxy server 31 (i.e., from the wireless email communications device 25 to the email server 22).

Figure 2:
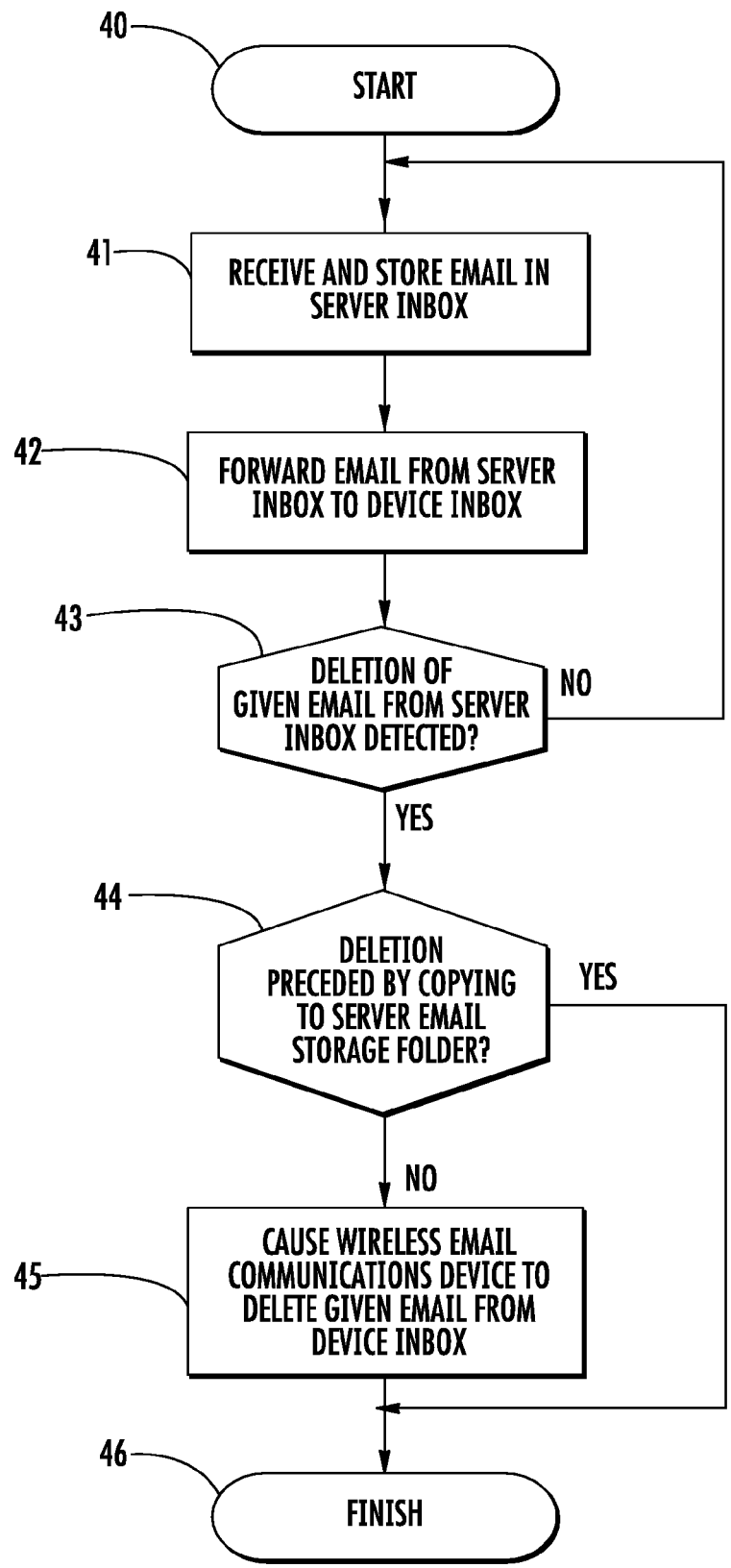
FIGS. 2 and 3 are flow diagrams illustrating email communications method aspects.
Figure 3:
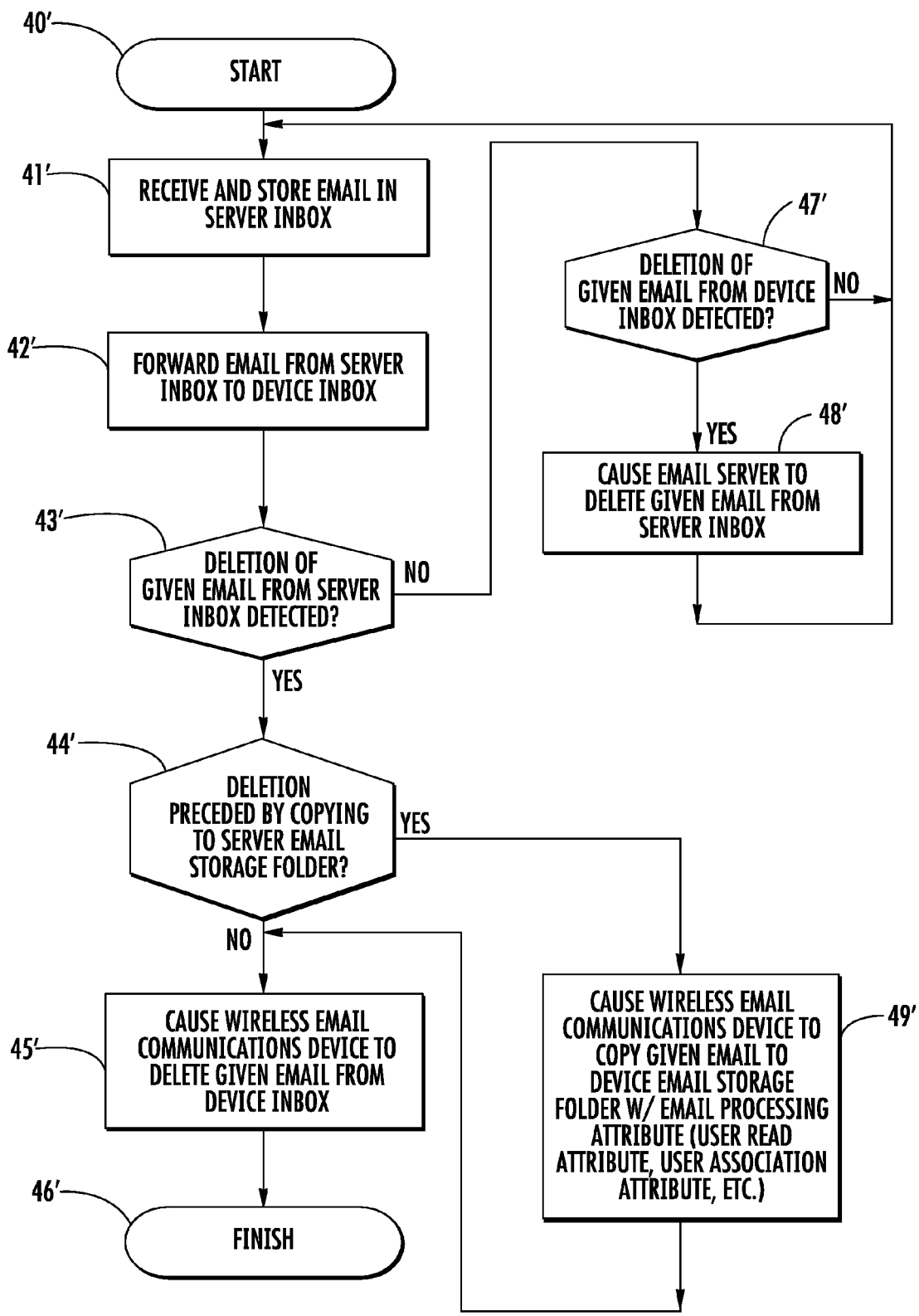

Turning now additionally to FIGS. 2 and 3, various email communications method aspects will now be described. Beginning at Block 40, email is received and stored in the server inbox 23 of the email server 22 via the communications network 21, at Block 41. The method further illustratively includes forwarding email from the server inbox 23 to the device inbox 26 on the wireless email communications device 25, at Block 42, and detecting a deletion of a given email from the server inbox 23, at Block 43. If the deletion of the given email from the server inbox 23 is not preceded by copying of the given email to the server email storage folder 24, at Block 44, then the email proxy server 31 causes the wireless email communications device 25 to also delete the given email from the device inbox 26 based thereon, at Block 45, thus concluding the illustrated method (Block 46).

It should be noted that while the MUA module 32 and the mail reconciliation module 33 of the email server 31 are shown as separate modules, these modules may in fact be implemented using common hardware and software components. Moreover, these various functions and file storage structures of the email server 22 and email proxy server 31 need not be performed within a single physical server, but may instead be distributed over a plurality of servers, as will be appreciated by those skilled in the art.

However, if the deletion of the given email from the sever inbox 23 is preceded by copying of the given email to the server email storage folder 24, then the email proxy server 31 may also cause the wireless email communications device 25 to copy the given email from the device inbox 26 to the device email storage folder 27 (along with the associated email processing attributes, as noted above, if desired), at Block 49', and delete the given email from the device inbox. As further noted above, operations such as deletions first performed on the wireless email communications device 25 may also be carried over or "mirrored" on the email server 22 as well (Blocks 47'-48') in some embodiments.

Exemplary components of a hand-held mobile wireless communications device 1000 that may be used in accordance the system 20 is further described in the example below with reference to FIG. 4. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 4:
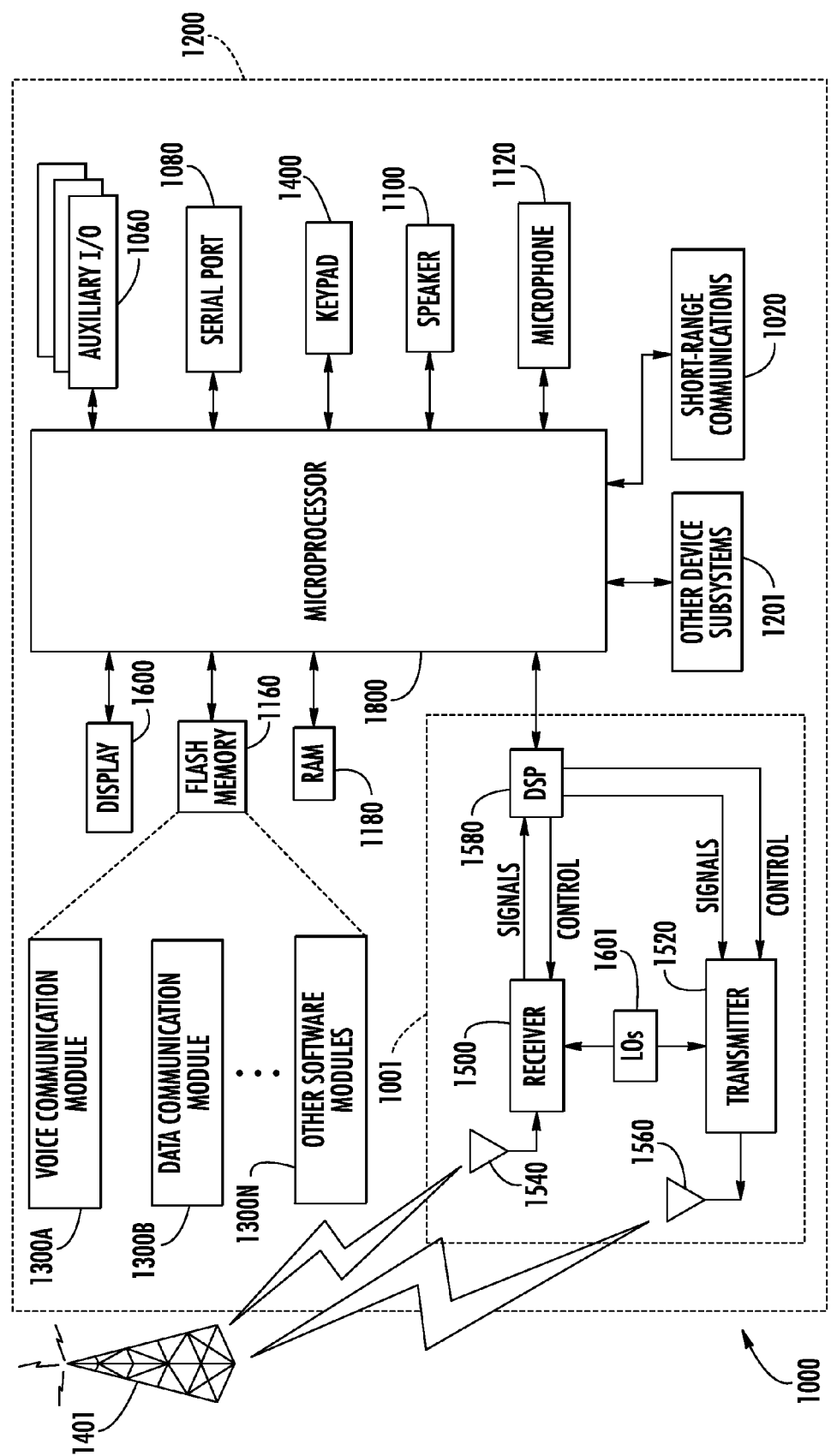
FIG. 4 is a schematic block diagram illustrating exemplary components of a mobile wireless communications device for use with the system of FIG. 1.

In addition to the processing device 1800, other parts of the mobile device 1000 are shown schematically in FIG. 4. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (Los) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3 GSM, 3 GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. An electronic mail (email) communications system for operating over a communications network, the email communications system comprising:
   an email server having a server inbox for receiving and storing email via the communications network and having a server email storage folder;
   at least one wireless email communications device having a device inbox; and
   an email proxy server for communicating with said email server and said at least one wireless email communications device via the communications network for
       forwarding email from the server inbox to the device inbox,
       detecting a deletion of a given email from the server inbox,
       determining if the detected deletion of the given email from the server inbox was accompanied by copying of the given email to the server email storage folder, and
       if the deletion of the given email from the server inbox is not accompanied by copying of the given email to the server email storage folder, then causing said wireless email communications device to also delete the given email from the device inbox based thereon.

2. The email communications system of claim 1 wherein said at least one wireless email communications device also has a device email storage folder; and wherein, if the deletion of the given email from the sever inbox is accompanied by copying of the given email to the server email storage folder, then said email proxy server also causes said wireless email communications device to copy the given email from the device inbox to the device email storage folder and delete the given email from the device inbox.

3. The email communications system of claim 2 wherein the given email has at least one email processing attribute associated therewith at said email server, and wherein said email proxy server cooperates with said at least one wireless email communications device to associate the at least one email processing attribute with the given email when copied to the device email storage folder.

4. The email communications system of claim 3 wherein the at least one email processing attribute comprises a user read attribute.

5. The email communications system of claim 3 wherein the at least one email processing attribute comprises a user association attribute.

6. The email communications system of claim 1 further comprising a wireless communications network over which said email proxy server and said wireless email communications device communicate.

7. The email communications system of claim 1 wherein said email proxy server also causes the email server to delete email deleted from said wireless email communications device.

8. An electronic mail (email) proxy server for communicating with an email server and at least one wireless email communications device via a communications network, the email server having a server inbox for receiving and storing email via the communications network and having a server email storage folder, and the at least one wireless email communications device having a device inbox, the email proxy server comprising:
   a mail user agent (MUA) module for forwarding email from the server inbox to the device inbox; and
   a mail reconciliation module for
   detecting a deletion of a given email from the server inbox,
   determining if the detected deletion of the given email from the server inbox was accompanied by copying of the given email to the server email storage folder, and
   if the deletion of the given email from the server inbox is not accompanied by copying of the given email to the server email storage folder, then causing the wireless email communications device to also delete the given email from the device inbox based thereon.

9. The email proxy server of claim 8 wherein said at least one wireless email communications device also has a device email storage folder; and wherein, if the deletion of the given email from the sever inbox is accompanied by copying of the given email to the server email storage folder, then said mail reconciliation module also causes said wireless email communications device to copy the given email from the device inbox to the device email storage folder and delete the given email from the device inbox.

10. The email proxy server of claim 9 wherein the given email has at least one email processing attribute associated therewith at said email server, and wherein said mail reconciliation module cooperates with said at least one wireless email communications device to associate the at least one email processing attribute with the given email when copied to the device email storage folder.

11. The email proxy server of claim 10 wherein the at least one email processing attribute comprises a user read attribute.

12. The email proxy server of claim 10 wherein the at least one email processing attribute comprises a user association attribute.

13. The email proxy server of claim 8 wherein said mail reconciliation module also causes the email server to delete email deleted from said wireless email communications device.

14. An electronic mail (email) communications method comprising:
   receiving and storing email in a server inbox of an email server via a communications network, the email server also having a server email storage folder;
   forwarding email from the server inbox to a device inbox on at least one wireless email communications device;
   detecting a deletion of a given email from the server inbox;
   determining if the detected deletion of the given email from the server inbox was accompanied by copying of the given email to the server email storage folder; and
   if the deletion of the given email from the server inbox is not accompanied by copying of the given email to the server email storage folder, then causing the wireless email communications device to also delete the given email from the device inbox based thereon.

15. The method of claim 14 wherein the at least one wireless email communications device also has a device email storage folder; and wherein, if the deletion of the given email from the sever inbox is accompanied by copying of the given email to the server email storage folder, then also causing the wireless email communications device to copy the given email from the device inbox to the device email storage folder and delete the given email from the device inbox.

16. The method of claim 15 wherein the given email has at least one email processing attribute associated therewith at the email server, and further comprising associating the at least one email processing attribute with the given email when copied to the device email storage folder.

17. The method of claim 16 wherein the at least one email processing attribute comprises a user read attribute.

18. The method of claim 16 wherein the at least one email processing attribute comprises a user association attribute.

19. The method of claim 14 wherein forwarding comprises forwarding email from the server inbox to the device inbox on at least one wireless email communications device via a wireless communications network.

20. The method of claim 14 further comprising causing the email server to delete email deleted from the wireless email communications device.

* * * * *